Figure 1:
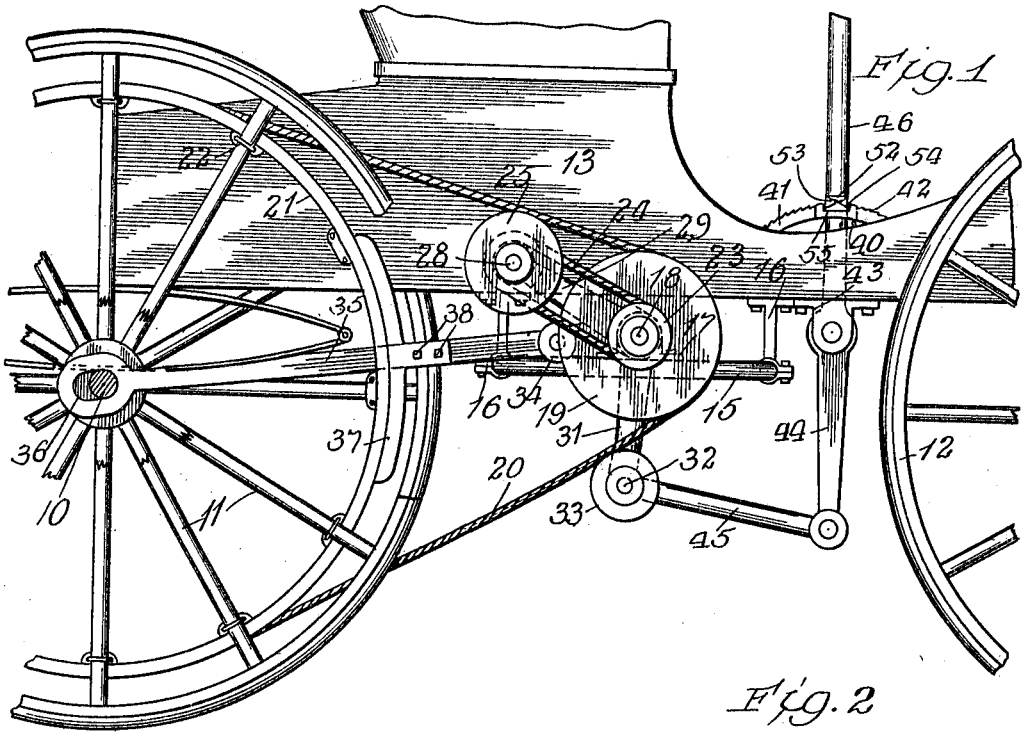

J. H. McELROY.
AUTOMOBILE.
APPLICATION FILED JAN. 21, 1907.

980,313.

Patented Jan. 3, 1911.
2 SHEETS—SHEET 1.

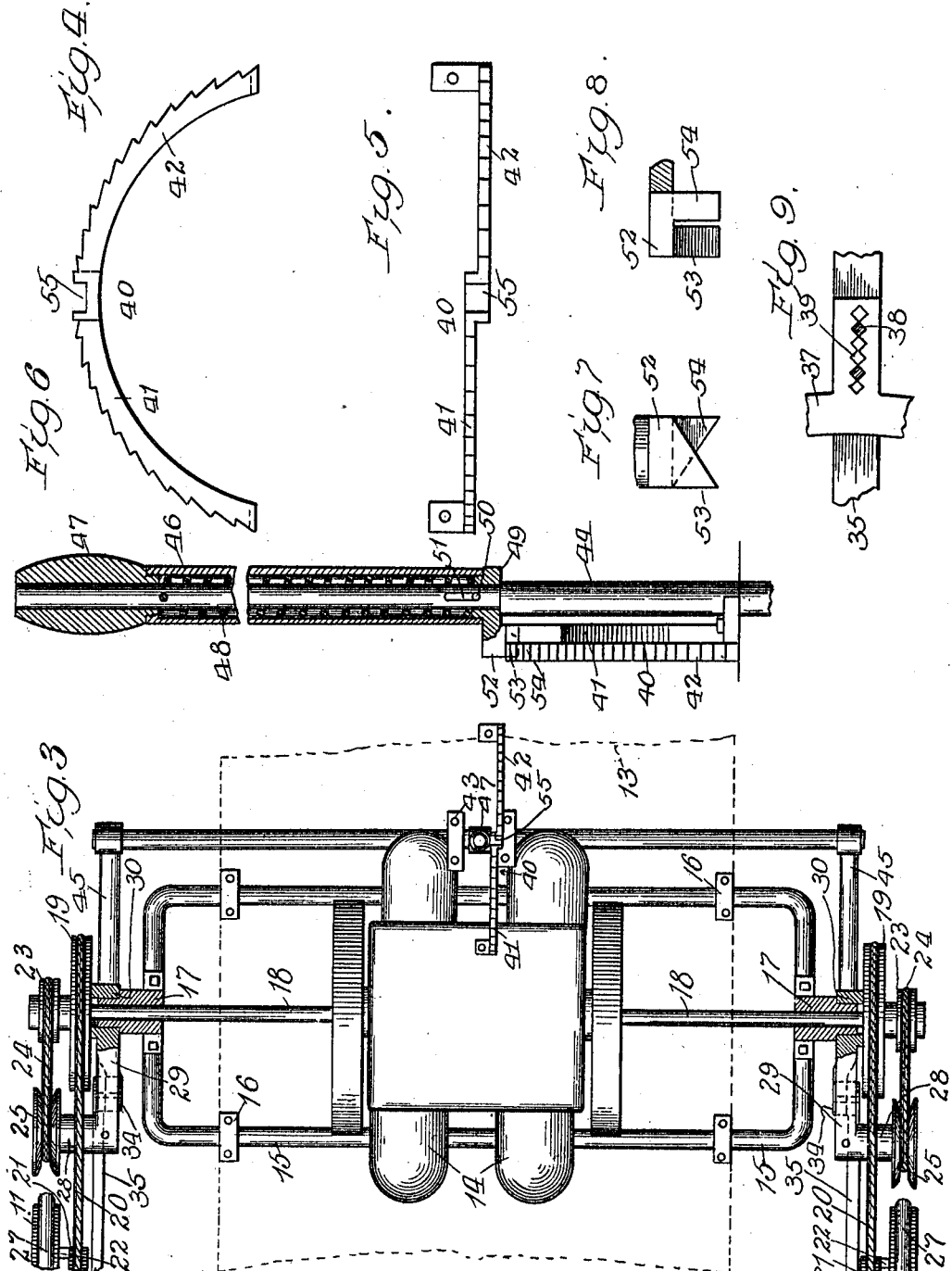

UNITED STATES PATENT OFFICE.

JOHN HOWARD McELROY, OF CHICAGO, ILLINOIS.

AUTOMOBILE.

980,313.  Specification of Letters Patent.  Patented Jan. 3, 1911.

Application filed January 21, 1907. Serial No. 353,325.

*To all whom it may concern:*

Be it known that I, JOHN HOWARD MC-ELROY, a citizen of the United States, and resident of Chicago, in the county of Cook and State of Illinois, have invented certain new and useful Improvements in Automobiles, of which the following is a full, clear, and exact specification.

My invention is concerned with a novel driving mechanism for automobiles or self-propelled vehicles, and is designed to produce a device of the class described which shall be extremely simple in construction, and which can be cheaply manufactured, and which shall have the highest efficiency in operation.

Figure 2:
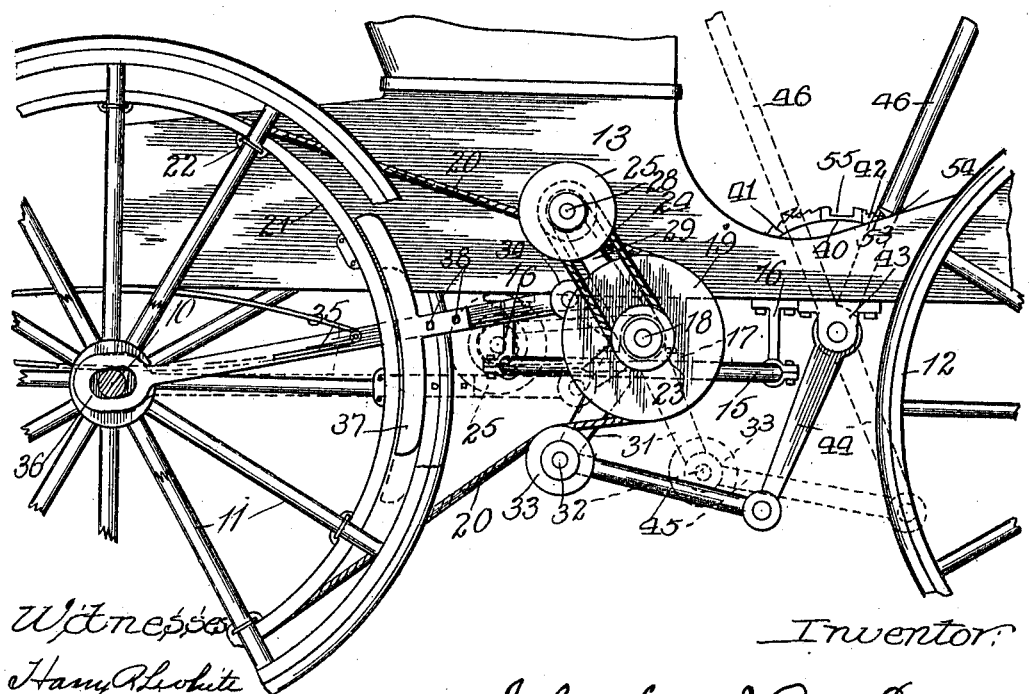

To illustrate my invention, I annex hereto two sheets of drawings, in which the same reference characters are used to designate identical parts in all the figures, of which:

Figure 1 is a side elevation of an automobile containing my invention, with a portion of the rim and spokes and hub of one of the traction wheels broken away, and showing the vehicle in its stopped and braked condition; Fig. 2 is a similar view, showing the parts in their forward driving position in full lines, and in their reversed driving position in dotted lines; Fig. 3 is a top plan view of the driving connections, with a portion of the bearings in section; Fig. 4 is a side elevation, and Fig. 5 a top plan view, of the rack bar for locking the controlling mechanism in any position of adjustment; Fig. 6 is a sectional view of the handle bar associated with the locking segment, showing the connections; Figs. 7 and 8 are side and front elevations of the detent dog coöperating with the ratchet segment; and Fig. 9 is a detail of the connections between the brake shoe and the supporting bar therefor.

In carrying out my invention as illustrated in a four-wheeled machine, I may employ the rear axle 10 upon which the traction wheels 11 are mounted, and preferably a front axle (not shown), upon which the steering wheels 12, provided with suitable steering mechanism (not shown), are mounted. The body or bed 13 is mounted upon the axles thus formed by any suitable means, preferably with interposed springs at the ends of the body, and resting on the axle, as indicated.

The engine 14 may be of any desired type, and is supported from the under side of the body, preferably by means of a frame 15, which is rigidly supported from the body, as by brackets 16. The end of the frame 15 carries bearings 17 for the engine-shaft 18, and this engine-shaft 18 has secured on the outer ends thereof the driving pulley-wheels 19, over which passes a rope or belt 20, which engages the rim 21, which is suitably mounted to rotate with the traction wheels 11, as by being secured to the spokes thereof by means of clips 22. The shaft 18 also has secured thereon, outside of the pulley-wheel 19, the reversing pulley 23. This pulley 23 coöperates, by means of a rope, belt or chain 24, with the inner portion of the grooved reversing disk 25. Of course, it will be understood that if I employ a sprocket chain, the wheel 23 will be a sprocket wheel and the reversing disk 25 will have sprocket teeth located at the extreme inner portion of its periphery, it being understood that in all forms the flaring outer portions of the periphery coöperate with the tires 27 of the traction wheel 11 to reverse the machine when the parts are moved to the position shown in dotted lines in Fig. 2. The reversing disk 25 is mounted upon a bearing 28 supported by the arm 29 of the hub 30, which is journaled on the reduced outer end of the bearing bracket 17, so as not to come in engagement with the engine-shaft 18, which is journaled on the interior of said bearing. The hub 30 is also provided with a second arm 31, which preferably carries the connecting rod 32 which connects the two arms on the two sides of the vehicle. Journaled on each end of this connecting rod 32, and outside the arms 31, is a tightening sheave 33, which, when the parts are moved to the position shown in Fig. 2, puts the rope 20 under sufficient tension to drive the machine. The hub 30 is also provided with a third arm 34, which has pivoted to its outer end the brake-supporting bar 35, the slotted outer end 36 of which embraces the axle 10 inside of the hub. The bar 35 carries the brake shoe 37, secured thereon by bolts 38, and I preferably provide for an easy adjustment by making the brake-shoe element 37 with the opposed ratchet portions 39 which engage the squared portions of the bolts 38. The brake-shoe 37 is designed to coöperate with the adjacent portion of the rim 21 which is unoccupied by the rope or belt 20.

At a suitable position in the bed, preferably centrally thereof, I secure a detent segment 40, which consists of the portions 41 and 42, which are in different planes and have their teeth pointing in opposite directions. Adjacent this detent and in suitable bearings 43 secured to the bottom of the bed, I pivot the operating lever 44, the lower end of which has a link 45 connecting it with the rod 32, so that as the lever 44 is moved to the various positions shown, the hub 30 and its associated arms will be rocked accordingly. As a convenient means for locking this lever 44, I make its upper end in the form of a rod, upon which I journal a sleeve 46 terminating in a handle 47. A helically-coiled expanding-spring 48 is secured at its upper end to the rod portion of the handle, and its lower end rests against a collar 49, closing the lower end of the handle. A pin 50 secured in the sleeve 46 and passing through a slot 51 in the handle prevents any rotation of the sleeve 46 relative to the handle 47. It will be seen that the spring tends to hold the dog 52, preferably formed integral with the collar 49, in engagement with the teeth of the ratchet segment 40. This dog 52 has one nose 53 facing in the proper direction and in the proper plane to engage the portion 42 of the segment when the handle is rocked in that direction to lock the parts in driving position. It also has the other nose 54 facing in the proper direction and in the proper plane to coöperate with the teeth of the portion 41 of the segment to lock it in the reversing position. The entire dog 52 coöperates with a vertical recess 55 common to both sections of the bar to lock the controlling mechanism in the stopping position shown in Fig. 1, in which the tension on the driving rope or belt 20 is not sufficient to move the vehicle, so that the engine-shaft rotates idly.

The operation of my improved apparatus will be readily apparent. With the parts in the position shown in Fig. 1, the vehicle is at rest. If it is desired to drive forward, the handle is thrown forward to the full-line position of Fig. 2, in which the tightening sheaves 33 put the ropes 20 under tension, so that the vehicle is driven forward. If it is desired to reverse the vehicle, the handle is raised and shifted to the dotted-line position, in which the constantly-rotating reversing-disk 25 is brought into engagement with the tire 27, and the vehicle is driven slowly backward. When it is brought to the stopping position, it will be seen that the brake shoe 37 is brought into engagement with the rim 21 to stop the vehicle, and is automatically carried out of engagement whether the connections are moved to drive the vehicle forward or backward.

I am aware of the structures shown in the patents to Olds, No. 594,338, and Baines, No. 640,522, and do not claim the same as my invention.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

Of course, it will be understood that my invention is not limited to four-wheeled vehicles, and that by the element "running gears," employed in the claims, I intend to include any frame having one or more traction wheels and one or more steering wheels associated therewith.

What I claim as new, and desire to secure by Letters Patent of the United States, is,—

1. In an automobile, the combination with the running gears comprising a traction wheel, of the driven pulley rotating the traction wheel, a driving pulley in the plane of the driven pulley and having its bearings immovable relative thereto, a rope or belt connecting said driving and driven pulleys, means for continuously rotating said driving pulley a reversing disk running with the driving pulley, and means for increasing the tension of the rope to drive the machine from the rotation of the driving pulley and for diminishing it to stop the machine without stopping the driving pulley, or for moving the reversing disk into engagement with the traction wheel when the rope is loose.

2. In an automobile, the combination with the running gears comprising a traction wheel, of the driven pulley rotating the traction wheel, a driving pulley in the plane of the driven pulley and having its bearings immovable relative thereto, a rope or belt connecting said driving and driven pulleys, an engine, an engine-shaft having the driving pulley secured thereon a reversing disk running with the driving pulley, and means for increasing the tension of the rope to drive the machine from the rotation of the driving pulley and for diminishing it to stop the machine without stopping the driving pulley, or for moving the reversing disk into engagement with the traction wheel when the rope is loose.

3. In an automobile, the combination with the running gears, comprising a traction wheel, of a driven pulley rotating the traction wheel, a driving pulley in the plane of the driven pulley and having its bearings immovable relative thereto, a rope or belt connecting said driving and driven pulleys, means for continuously rotating said driving pulley, a pivoted controlling lever, a detent segment over which it swings and with which it coöperates to secure it in different positions, and a tightening pulley interposed between said driving and driven pulleys and swung positively about the driving pulley by said lever to tighten or loosen the rope with which it coöperates.

4. In an automobile, the combination with the running gears comprising a traction wheel, of the driven pulley rotating the traction wheel, a driving pulley in the plane of the driven pulley and having its bearings immovable relative thereto, a rope or belt connecting said driving and driven pulleys, an engine, an engine-shaft having the driving pulley secured thereon, and means for increasing the tension of the rope to drive the machine from the rotation of the driving pulley and for diminishing it to stop the machine without stopping the driving pulley, consisting of a tightening pulley coöperating with the rope, a pivoted arm carrying said pulley, and means for moving said arm and securing it in tightening or loosening position.

5. In an automobile, the combination with the running gears, comprising a traction wheel, of a driven pulley rotating the traction wheel, a driving pulley in the plane of the driven pulley and having its bearings immovable relative thereto, a rope or belt connecting said driving and driven pulleys, an engine, an engine shaft having the driving pulley secured thereon, a pivoted controlling lever, a detent segment over which it swings and with which it coöperates to secure it in different positions, and a tightening pulley interposed between said driving and driven pulleys and swung positively about the driving pulley by said lever to tighten or loosen the rope with which it coöperates.

6. In an automobile, the combination with the running gears comprising a traction wheel, of the driven pulley rotating the traction wheel, a driving pulley in the plane of the driven pulley and having its bearings immovable relative thereto, a rope or belt connecting said driving and driven pulleys, means for continuously rotating said driving pulley, and means for increasing the tension of the rope to drive the machine from the rotation of the driving pulley and for diminishing it to stop the machine without stopping the driving pulley, consisting of a tightening pulley located between the driving and driven pulley and swinging about the axis of the driving pulley as a center and coöperating with the rope, and means for swinging said arm and securing it in tightening or loosening position.

7. In an automobile, the combination with the running gears comprising a traction wheel, of the driven pulley rotating the traction wheel, a driving pulley having its bearings immovable relative thereto, a rope or belt connecting said driving and driven pulley, means for continuously rotating said driving pulley, and means for increasing the tension of the rope to drive the machine from the rotation of the driving pulley and for diminishing it to stop the machine without stopping the driving pulley, consisting of a tightening pulley located between the driving and driven pulley and swinging about the axis of the driving pulley as a center and coöperating with the rope, a pivoted arm carrying said pulley, and means for swinging said arm and securing it in tightening or loosening position.

8. In an automobile, the combination with the running gears comprising a traction wheel, of the driven pulley rotating the traction wheel, a driving pulley having its bearings immovable relative thereto, a rope or belt connecting said driving and driven pulleys, means for continuously rotating said driving pulley, and means for increasing the tension of the rope to drive the machine from the rotation of the driven pulley and for diminishing it to stop the machine without stopping the driving pulley, consisting of a tightening pulley located between the driving and the driven pulley, coöperating with the rope, a pivoted arm carrying said pulley, and means for moving said arm and securing it in tightening or loosening position.

9. In an automobile, the combination with the running gears comprising a traction wheel, of a driven pulley rotating the traction wheel, a driving pulley having its bearings immovable relative thereto, a rope or belt connecting said driving and driven pulleys, an engine, an engine-shaft to which said driving pulley is secured, and means for increasing the tension of the rope to drive the machine from the rotation of the driving pulley and for diminishing it to stop the machine without stopping the driving pulley, consisting of a tightening pulley located between the driving and driven pulley and swinging about the axis of the driving pulley as a center and coöperating with the rope, a pivoted arm carrying said pulley, and means for swinging said arm and securing it in tightening or loosening position.

10. In an automobile, the combination with the running gears comprising a traction wheel, of the driven pulley rotating the traction wheel, a driving pulley having its bearings immovable relative to the driven pulley, a rope or belt connecting said driving and driven pulleys, means for continuously rotating said driving pulley, a brake coöperating with the driven pulley, and means for simultaneously releasing the brake and increasing the tension of the rope to drive the machine from the rotation of the driving pulley, and for applying the brake and diminishing the tension to stop the machine without stopping the driving pulley.

11. In an automobile, the combination with the running gears comprising a traction wheel, of the driven pulley rotating the traction wheel, a driving pulley having its bearings immovable relative to the driven pulley, a rope or belt connecting said driving and driven pulleys, an engine, an engine-shaft to which said driving pulley is secured, a brake coöperating with the driven pulley, and means for simultaneously releasing the brake and increasing the tension of the rope to drive the machine from the rotation of the driving pulley, and for applying the brake and diminishing the tension to stop the machine without stopping the driving pulley.

12. In an automobile, the combination with the running gears comprising a traction wheel, of the driven pulley rotating the traction wheel, a driving pulley having its bearings immovable relative to the driven pulley, a rope or belt connecting said driving and driven pulleys, means for continuously rotating said driving pulley, a brake, and means for simultaneously releasing the brake and increasing the tension of the rope to drive the machine from the rotation of the driving pulley, and for applying the brake and diminishing the tension to stop the machine without stopping the driving pulley, consisting of a tightening pulley coöperating with the rope, a pivoted arm carrying said pulley, and means for moving said arm and the brake and securing them in driving or stopping position.

13. In an automobile, the combination with the running gears comprising a traction wheel, of the driven pulley rotating the traction wheel, a driving pulley having its bearings immovable relative to the driven pulley, a rope or belt connecting said driving and driven pulleys, an engine, an engine-shaft to which the driving pulley is secured, a brake, and means for simultaneously releasing the brake and increasing the tension of the rope to drive the machine from the rotation of the driving pulley, and for applying the brake and diminishing the tension to stop the machine without stopping the driving pulley, consisting of a tightening pulley coöperating with the rope, a pivoted arm carrying said pulley, and means for moving said arm and the brake and securing them in driving or stopping position.

14. In an automobile, the combination with the running gears comprising a traction wheel, of the driven pulley rotating the traction wheel, a driving pulley having its bearings immovable relative to the driven pulley, a rope or belt connecting said driving and driven pulleys, means for continuously rotating said driving pulley, a brake coöperating with the driven pulley, and means for simultaneously releasing the brake and increasing the tension of the rope to drive the machine from the rotation of the driving pulley, and for applying the brake and diminishing the tension to stop the machine without stopping the driving pulley, consisting of a tightening pulley coöperating with the rope, a pivoted arm carrying said pulley and means for moving said arm about the axis of the driving pulley as a center.

15. In an automobile, the combination with the running gears comprising a traction wheel, of the driven pulley rotating the traction wheel, a driving pulley having its bearings immovable relative to the driven pulley, a rope or belt connecting said driving and driven pulleys, means for continuously rotating said driving pulley, a radially-movable brake-shoe supported from the axle of the wheel with which it coöperates, and means for moving the shoe from the wheel and increasing the tension of the rope to drive the machine from the rotation of the driving pulley, and for diminishing the tension of the rope and applying the brake to stop the machine without stopping the driving pulley.

16. In an automobile, the combination with the running gears comprising a traction wheel, of the driven pulley rotating the traction wheel, a driving pulley having its bearings immovable relative to the driven pulley, a rope or belt connecting said driving and driven pulleys, an engine, an engine-shaft to which the driving pulley is secured, a radially-movable brake-shoe supported from the axle of the wheel with which it coöperates, and means for moving the shoe from the wheel and increasing the tension of the rope to drive the machine from the rotation of the driving pulley and for diminishing the tension of the rope and applying the brake to stop the machine without stopping the driving pulley.

17. In an automobile, the combination with the running gears comprising a traction wheel, of the driven pulley rotating the traction wheel, a driving pulley having its bearings immovable relative to the driven pulley, a rope or belt connecting said driving and driven pulleys, means for continuously rotating said driving pulley, a radially-movable brake-shoe, and means for moving the shoe from the wheel and increasing the tension of the rope to drive the machine from the rotation of the driving pulley and for diminishing the tension of the rope and applying the brake to stop the machine without stopping the driving pulley, consisting of a tightening pulley coöperating with the rope, and means for simultaneously moving said arm and the brake and securing them in driving or stopping position.

18. In an automobile, the combination with the running gears, of the traction wheel the driven pulley concentric therewith and driving said traction wheel, the driving shaft, means for continuously rotating it in one direction, driving connections between said shaft and traction wheel for moving the vehicle forward or backward, or for stopping it, movable braking mechanism, and a single controlling element for moving the brake away from the driven pulley with which it coöperates and starting the vehicle in either direction, or for stopping the vehicle and applying the brake.

19. In an automobile, the combination with the running gears, of the traction wheel the driven pulley concentric therewith and driving said traction wheel, the driving shaft, means for continuously rotating it in one direction, driving connections between said shaft and traction wheel for moving the vehicle forward or backward, or for stopping it, movable braking mechanism, and a single lever for moving the brake away from the driven pulley with which it coöperates and starting the vehicle in either direction, or for stopping the vehicle and applying the brake.

20. In an automobile, the combination with the running gears, of the traction wheel, the driving shaft, means for continuously rotating it in one direction, driving connections between said shaft and traction wheel for moving the vehicle forward or backward, or for stopping it, braking mechanism, and a single controlling element for releasing the brake and starting the vehicle in either direction, or for stopping the vehicle and applying the brake, and for locking said driving connections and braking mechanism in either of the three positions.

21. In an automobile, the combination with the running gears, of the traction wheel, the driving shaft, means for continuously rotating it in one direction, driving connections between said shaft and traction wheel for moving the vehicle forward or backward or for stopping it, braking mechanism, and a single controlling lever and detent for releasing the brake and starting the vehicle in either direction, or for stopping the vehicle and applying the brake, and for locking said driving connections and braking mechanism in either of the three positions.

22. In an automobile, the combination with the running gears, of the traction wheel, the driving shaft, means for continuously rotating it in one direction, driving connections between said shaft and traction wheel for moving the vehicle forward or backward, or for stopping it, braking mechanism, and a single controlling element for releasing the brake and starting the vehicle in either direction, or for stopping the vehicle and applying the brake, capable of being secured in any of its three positions.

23. In an automobile, the combination with the running gears, of the traction wheel, the driving shaft, means for continuously rotating it in one direction, driving connections between said shaft and traction wheel for moving the vehicle forward or backward, or for stopping it, braking mechanism, and a single controlling element for releasing the brake and starting the vehicle in either direction, or for stopping the vehicle and applying the brake, capable of being secured in any of its three positions, and secured at any degree of firmness in either of the driving positions.

24. In an automobile, the combination with the running gears, of the traction wheel, the driving shaft, means for continuously rotating it in one direction, driving connections between said shaft and traction wheel for moving the vehicle forward or backward, or for stopping it, braking mechanism, and a single controlling element for releasing the brake and starting the vehicle in either direction, or for stopping the vehicle and applying the brake, capable of being secured in any of its three positions, and means for securing it with any desired degree of firmness in either of its driving positions, consisting of a ratchet segment with oppositely-facing teeth on each half, and a detent carried by the element and adapted to engage with either set of teeth.

25. In an automobile, the combination with the running gears, of the traction wheel, the driving shaft, means for continuously rotating it in one direction, driving connections between said shaft and traction wheel for moving the vehicle forward or backward, or for stopping it, braking mechanism, and a single controlling element for releasing the brake and starting the vehicle in either direction, or for stopping the vehicle and applying the brake, capable of being secured in any of its three positions, and means for securing it with any desired degree of firmness in either of its driving positions, consisting of a ratchet segment with oppositely-facing teeth on each half, a central square-shouldered locking notch for the stopping position, and a detent carried by the element and adapted to engage with either set of teeth or with the central locking notch.

26. The combination with the lever, of the ratchet segment with the oppositely-facing teeth on each half, the two halves being offset, and the spring-pressed detent carried by the lever having the dog with the two oppositely-facing noses in the plane of the respective halves of the segment.

27. The combination with the lever, of the ratchet segment with the oppositely-facing teeth on each half and the locking recess at the center, the two halves being offset, and the spring-pressed detent carried by the lever having the dog with the two oppositely-facing noses in the plane of the respective halves of the segment and adapted to engage with the locking recess.

28. In an automobile, the combination with the running gears comprising a traction wheel, of the driving shaft mounted in stationary bearings, means for constantly rotating said driving shaft in one direction, the driving pulley-wheel carried thereby, the driven pulley rotating the traction wheel, a rope connecting the pulleys, means for tightening or loosening the rope to stop or start the machine, the brake shoe adapted to coöperate with the driven pulley, and means for simultaneously applying the brake shoe and loosening the rope, or for tightening the rope and disengaging the brake shoe.

29. In an automobile, the combination with the running gears comprising a traction wheel, of the driving shaft mounted in stationary bearings, means for constantly rotating said driving shaft in one direction, the driving pulley carried thereby, the driven pulley rotating the traction wheel, a rope connecting the pulleys, reversing mechanism driven from said shaft, and means for simultaneously releasing the brake and tightening the rope or engaging the reversing mechanism, or for applying the brake and loosening the rope or disengaging the reversing mechanism.

30. In an automobile, the combination with the running gears comprising the traction wheel, the driving shaft mounted in stationary bearings, means for rotating said driving shaft, the driving pulley, the driven pulley rotating the traction wheel, a rope connecting said pulleys, means for tightening or loosening the rope, the reversing disk driven from the driving shaft, and means for moving the reversing disk into or out of engagement and simultaneously loosening or tightening the rope.

31. In an automobile, the combination with the running gears comprising the traction wheel, the driving shaft mounted in stationary bearings, means for rotating said driving shaft, the driving pulley, the driven pulley rotating the traction wheel, a rope connecting said pulleys, means for tightening or loosening the rope, the reversing disk driven from the driving shaft by means of a sheave on the driving shaft and a rope connection between said sheave and reversing disk, and means for moving the reversing disk into or out of engagement and simultaneously loosening or tightening the rope.

32. In an automobile, the combination with the running gears comprising a traction wheel, of the driving shaft mounted in stationary bearings, means for constantly rotating said driving shaft in one direction, a driving pulley carried thereby, the driven pulley rotating the traction wheel, a rope connecting the pulleys, braking mechanism, the reversing disk driven from the shaft, and means for releasing the brake and simultaneously moving the reversing disk into engaging position or tightening the rope, or for applying the brake and moving the reversing disk out of engaging position or loosening the rope.

33. In an automobile, the combination with the brake disk, of the brake bar carrying the brake shoe, said bar having a sliding bearing on the axis of the brake disk, and means for moving the brake bar radially.

34. In an automobile, the combination with the brake disk, of the brake bar carrying the brake shoe, said bar having a sliding bearing on the axis of the brake disk, and means for moving the brake bar radially, consisting of a rocking arm pivoted to the bar, and connections between said arm and an operating lever.

35. In an automobile, the combination with the brake disk, of the brake bar carrying the brake shoe having a sliding bearing on the axis of the brake disk, and a sleeve having one arm pivoted to the brake bar and another arm which in one position drives the vehicle.

36. In an automobile, the controlling element having the forward driving arm carrying an idle sheave, the reversing arm carrying a driving sheave and the braking arm, and means for rotating said element into position in which either of said arms will operate.

37. In an automobile, the controlling element having the forward driving arm carrying an idle sheave, the reversing arm carrying a driving sheave and the braking arm, and means for rotating said element into position in which either of said arms will operate, and securing it in said position.

38. In an automobile, the controlling element having the forward driving arm carrying an idle sheave, the reversing arm carrying a driving sheave and the braking arm, and means for rotating said element into position in which either of said arms will operate, and securing it in said position with varying degrees of application of the two driving arms.

39. In an automobile, the driving shaft, a bearing therefor, a three-arm controlling sleeve journaled on said bearing, starting and stopping and reversing mechanisms brought into action by said sleeve in the different positions, and means for moving it to said positions.

40. In an automobile, the driving shaft, a bearing therefor, a three-arm controlling sleeve journaled on said bearing, starting and stopping and reversing mechanisms brought into action by said sleeve in the different positions, and means for moving it to said positions and locking it in any of said positions.

In witness whereof, I have hereunto set my hand and affixed my seal, this 19th day of January, A. D. 1907.

JOHN HOWARD McELROY. [L. S.]

Witnesses:
JNO. G. ELLIOTT,
M. S. REEDER.